C. G. HASTINGS.
EXCAVATOR.
APPLICATION FILED NOV. 26, 1915.
1,240,445.
Patented Sept. 18, 1917.
4 SHEETS—SHEET 1.
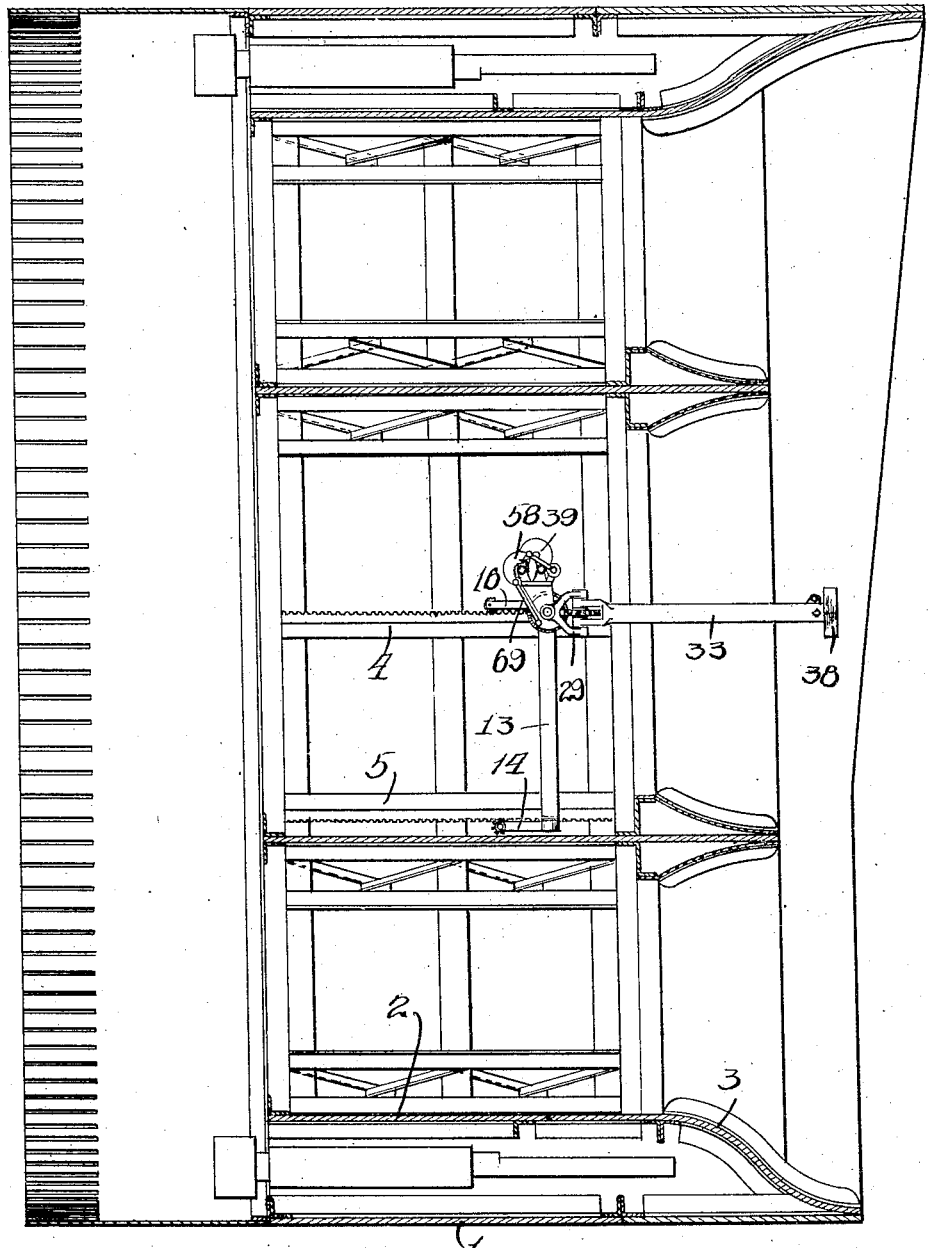

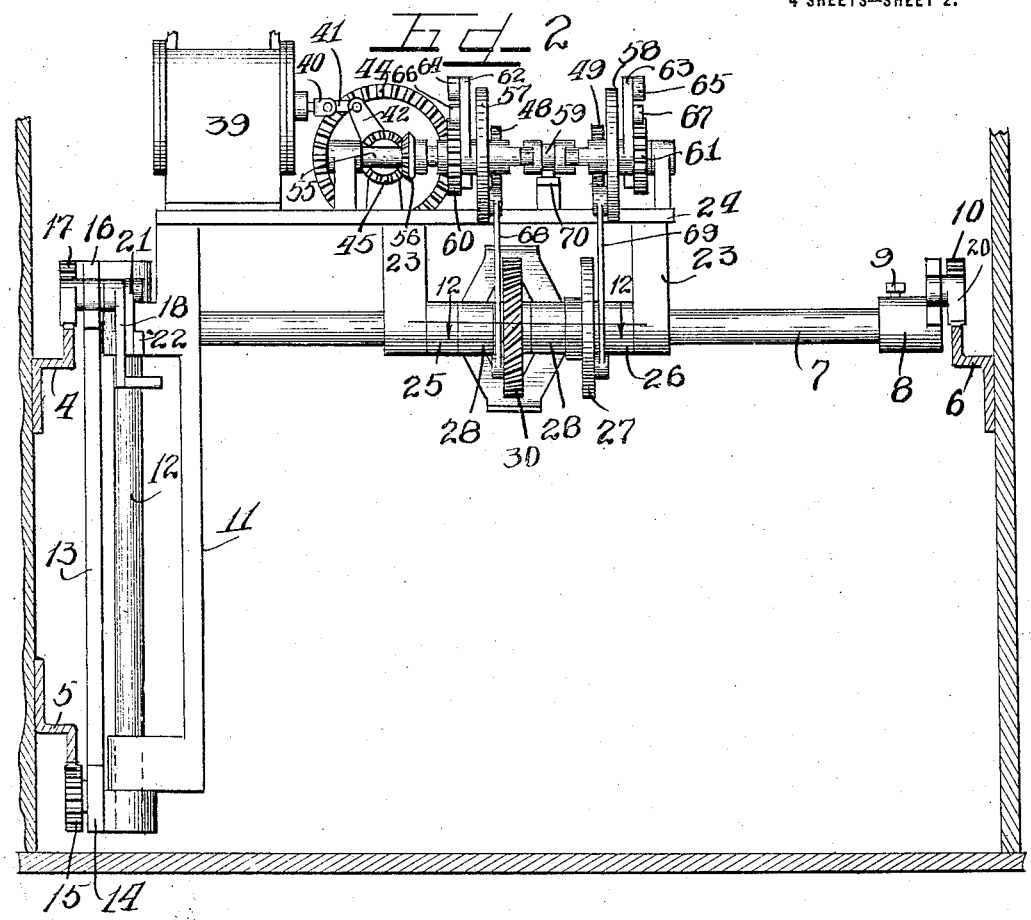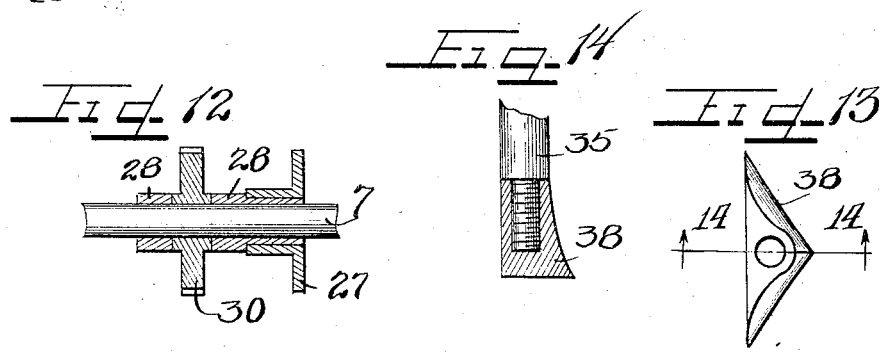

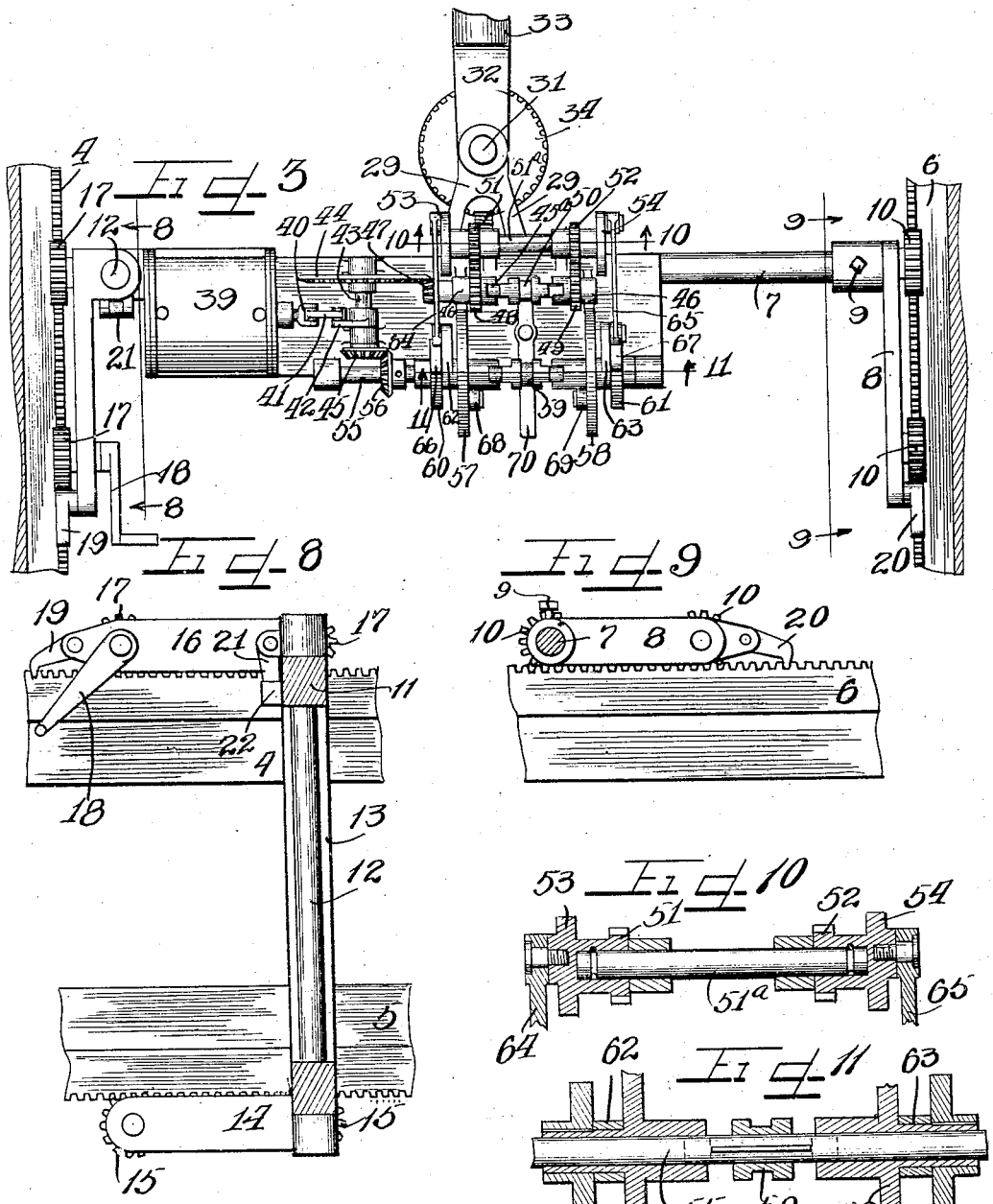

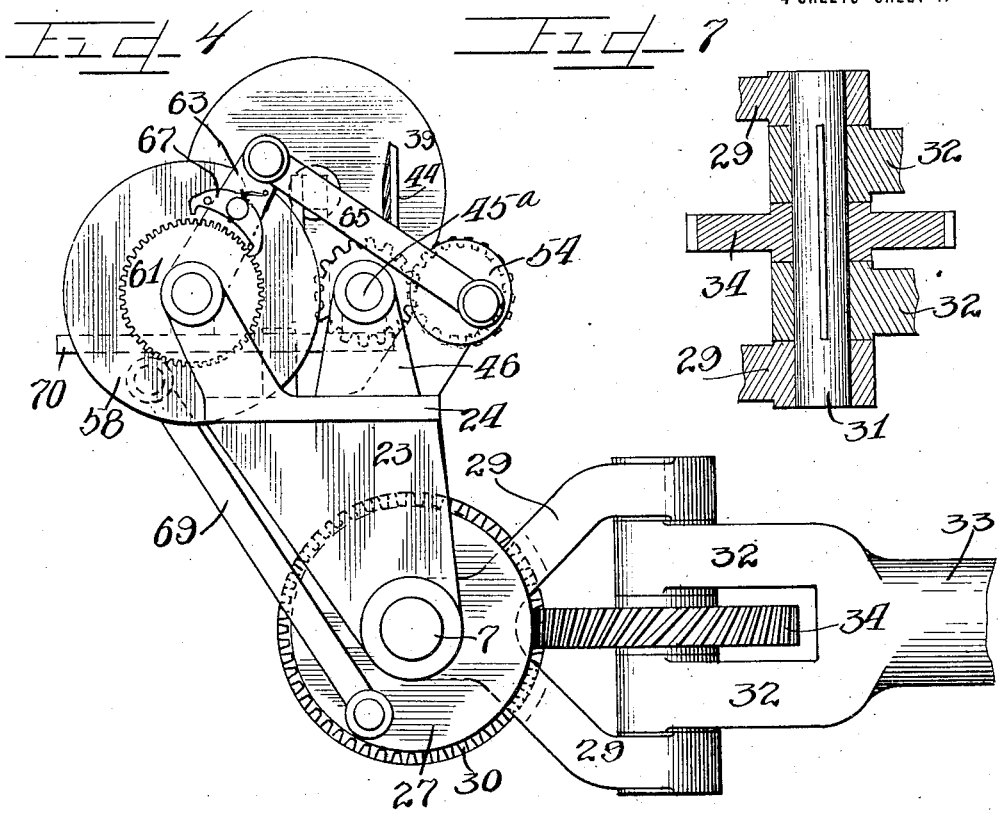
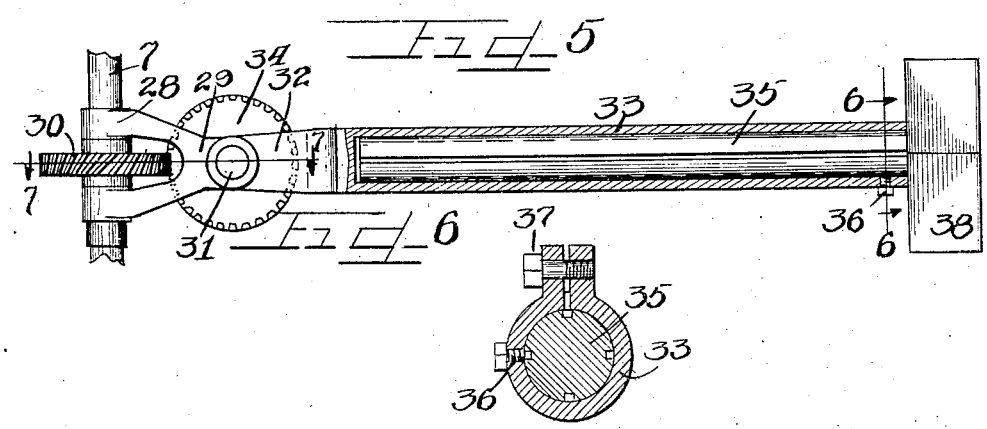

UNITED STATES PATENT OFFICE.

CORNELIUS G. HASTINGS, OF GLENDALE, CALIFORNIA, ASSIGNOR TO HASTINGS TUNNEL SYSTEM COMPANY, A CORPORATION OF NEW YORK.

EXCAVATOR.

1,240,445.

Specification of Letters Patent.

Patented Sept. 18, 1917.

Application filed November 26, 1915. Serial No. 63,492.

*To all whom it may concern:*

Be it known that I, CORNELIUS G. HASTINGS, a citizen of the United States, and a resident of the city of Glendale, in the county of Los Angeles and State of California, have invented certain new and useful Improvements in Excavators; and I do hereby declare that the following is a full, clear, and exact description of the same, reference being had to the accompanying drawings, and to the numerals of reference marked thereon, which form a part of this specification.

This invention relates to an improved mechanism for excavation purposes particularly adapted for use in the projection of a tunnel bore, the mechanism being designed to cut the material through which the bore is projected, and operating over a wide area both horizontally and vertically during the course of operation. My invention is furthermore particularly well adapted for use within a tunneling shield, where such is used, and as shown and described herein is equipped with mechanisms for mounting the excavating device within the shield in a manner to permit advancement of the device relative to the shield.

It is an object therefore of this invention to construct an excavating device adapted to be mounted within a tunnel shield upon suitable mechanisms for advancing and retracting the excavating device as the case requires, and with a power drive associated with the device to cause movement thereof over a certain area of the wall from which the material is cut by the device.

It is also an object of this invention to construct an excavating device particularly adapted for use with tunnel shields for projecting a tunnel bore, which is driven by suitable power mechanisms acting to reciprocate the cutting element of the device both horizontally and vertically over a certain area, cutting the material and being advanced from time to time as the case may require.

It is furthermore an important object of this invention to construct an excavating device wherein the cutting mechanism is capable of a reciprocating movement both horizontally and vertically, and by suitable adjustment of the device can be made to operate in one direction in a series of cuts, or if desired in a series of cuts in another direction and over a certain area, and with the cutter head adapted for adjustment, depending upon the kind of cut to be made.

It is finally an object of this invention to construct an improved type of excavating device essentially automatic in operation, acting to cut and break the material from the wall through which the bore is projected, and capable of being advanced from time to time after a cut has been made over a certain area of the wall.

The invention (in a preferred form) is illustrated in the drawings and hereinafter more fully described.

In the drawings:

Figure 1 is a central vertical section taken through a tunneling shield showing the same equipped with an excavating device embodying the principles of my invention.

Fig. 2 is a rear elevation of the excavating device as mounted within a tunneling shield.

Fig. 3 is a plan view of the mechanisms shown in Fig. 2.

Fig. 4 is a fragmentary side view illustrating the mechanisms of the excavating device.

Fig. 5 is an enlarged detail plan view of the telescoping arms of the swingingly adjustable cutter head, with parts shown in section.

Fig. 6 is a fragmentary detail section taken on line 6—6 of Fig. 5.

Fig. 7 is a detail section with parts in elevation taken on line 7—7 of Fig. 5, and with parts omitted.

Fig. 8 is a view taken on line 8—8 of Fig. 3, with parts shown in section and parts in elevation.

Fig. 9 is a similar view taken on line 9—9 of Fig. 3.

Fig. 10 is a sectional detail taken on line 10—10 of Fig. 3.

Fig. 11 is a sectional detail taken on line 11—11 of Fig. 3.

Fig. 12 is a detail section taken on line 12—12 of Fig. 2.

Fig. 13 is a top plan view of the cutter head detached.

Fig. 14 is a sectional detail taken on line

14—14 of Fig. 13, showing the means of attaching the cutter head to the rod on which it is mounted.

As shown in the drawings:

Inasmuch as the tunneling shield shown in Fig. 1, forms in itself no part of the present invention, a brief description thereof will suffice. Said shield consists of two cylindrical shells concentric with one another, the outer one of which is denoted by the reference numeral 1, and the inner one by the reference numeral 2, and said shells are, as clearly shown, spaced one from another, and connected at their forward or leading edges, by a smoothly curved outwardly flaring apron or ring of metal 3, which is of greater length at the upper end of the shield and decreases in depth to a point below the middle thereof. Mounted upon the framework within the tunneling shield at one side thereof, is an upwardly toothed track or rack 4, and beneath the same and parallel thereto is a downwardly directed toothed track or rack 5, and on the other side of the framework within said shield, is another track 6, directed upwardly and at the same height and parallel with said toothed rack or track 4. Said tracks afford a support for the excavating device, as well as to receive means forming a part thereof for co-action therewith to advance the excavating device from time to time as the material is cut away. Accordingly, a relatively heavy circular shaft or rod 7, is provided, adapted to extend between the respective tracks 4 and 6, and at one end projecting into a bracket 8, in which it is held releasably by a set screw 9, said bracket 8, extending parallel to said track 6, for a considerable length and having journaled therein pinions 10, adapted to rest upon and mesh with the teeth of said track. The other end of said shaft or rod 7, projects into a pivot bracket, which is shown in Figs. 2 and 8, denoted by the reference numeral 11, extending vertically and pivotally mounted upon a vertical shaft 12, which is in turn held in engagement in a bracket 13, said bracket 13, at its lower end, being provided with an extension 14, having journaled therein pinions 15, tracking beneath the lower track 5, and at its upper end has an extension 16, provided with pinions 17, tracking upon the upper track 4, and with an actuating crank 18, connected to one of said pinions 17, to rotate the same and thus move the entire carriage on said tracks.

Longitudinally mounted back of the pinions 17, on the extension 16, is a pawl 19, operating by gravity when swung downwardly to track over the teeth of the rack 4, and prevent retractive movement of the carriage, and similarly a pawl 20, is provided, pivoted on the bracket 8, and co-acting with the teeth on the rack 6. The purpose of so constructing the carriage, that is, with the shaft 7, pivotally mounted at one end on the bracket 13, is to permit the shaft and associated mechanisms mounted thereon to be swung out of the way, rearwardly substantially parallel to the axis of the tunneling shield. A locking device is provided for normally preventing the shaft 7, swinging rearwardly on its pivot, when in position for operation, and for this purpose, as shown in Figs. 2, 3, and 8, a gravity acting pawl or dog 21, is pivoted on the upper end of the hinge or pivot member 13, and normally rests behind a stop or lug 22, provided on the upper end of said member 11, and in order to permit said shaft 7, and member 11, to be swung back on the pivot shaft 12, it is necessary to swing said dog 21, outwardly beyond said stop 22. The upper end of the member 11, is extended, and together with rigid bracket arms 23, secured upon the shaft 7, serves to support a table 24, mounted above and parallel to said shaft 7. Mounted on said shaft 7, adjacent the bracket arms 23, are collars 25 and 26, respectively, and rotatable on said shaft adjacent the collar 26, is a disk 27, the hub of which is keyed or otherwise suitably secured to one of the yoke arms 28, of a double yoke, the other arms of which, denoted by the reference numeral 29, are disposed or alined vertically, as clearly shown in Fig. 4. The other one of said yoke arms 28, is disposed adjacent the collar 25, and journaled between said yoke arms 28, is a helical gear 30. A large pintle shaft 31, is mounted vertically in the yoke arms 29, and journaled thereon are the yoke arms 32, of a relatively long tubular bar or arm 33, and rigidly connected to said yoke arms and disposed therebetween is a helical gear 34, meshing with the helical gear 30. Telescoping within said tubular arm 33, is a grooved arm or rod 35, and a set screw 36, is provided in said tubular arm 33, to lock said arm 35, from rotation within the tubular arm 33, by engagement with one of the grooves thereof, and an adjusting or clamping bolt 37, is provided in flanged portions at the end of said tubular arm 33, which is split for the purpose, to clamp the same tightly around said rod 35, to hold the same in any extended position of adjustment within said arm 33. Mounted on the end of said arm 35, is a cutter head 38, which, as shown in the detail illustrated in Fig. 14, has a threaded connection on the reduced end of said shaft 35.

Mechanisms are mounted upon the table 24, for the purpose of actuating or swinging the cutter head 38, on the end of its supporting arm 33—35. For this purpose a steam cylinder 39, is disposed at one end of the table 24, and formed on the end of the piston rod thereof is a yoke 40, in which is connected a short link or connecting rod 41, which is also connected to a crank 42, secured upon a shaft 43, journaled in bearings on said table 24, so that reciprocation of said piston rod serves to oscillate said shaft. Secured near one end on said shaft 43, is a large bevel gear 44, and on the other end of said shaft, a small bevel pinion 45. A shaft 45ª, is mounted in bearings 46, on said table 24, and is provided on one of its ends with a small bevel pinion 47, meshing with the bevel gear 44, and the gear ratio is such that one reciprocation or oscillation of the piston rod causes said shaft 45ª, to be driven one complete revolution. Journaled loosely on said shaft 45ª, near each end thereof, are gears 48 and 49, respectively, the hub of each formed to afford a female member of a jaw clutch, the male member 50, of which is feathered on said shaft 45ª, and slidable between said respective gears 48 and 49, and adapted to engage either one, but not both thereof, simultaneously, to said shaft 45ª, for rotation therewith. Mounted parallel to said shaft 45ª, in bearings provided for the purpose, is another shaft 51ª, and loosely journaled on each end thereof are gears 51 and 52, respectively, meshing with said respective gears 48 and 49, and of the same diameter as the latter, that is, with a gear ratio of one to one, so that for each complete rotation or complete oscillation of the shaft 45ª, said gears 51 and 52, rotate likewise, depending on which one thereof is driven, according to which one of the gears 48 or 49, is engaged by the clutch 50.

Rigidly secured or connected to the gear 51, is an eccentric 53, and similarly connected to the gear 52, is an eccentric 54. At the opposite side of the table 24, from said shaft on which the gears 51 and 52, are journaled, is another shaft 55, journaled in suitable bearings provided for the purpose and parallel to said shaft 45ª, and secured on said shaft 55, is a bevel pinion 56, meshing with the bevel pinion 45, whereby said shaft 45ª, is oscillated coincidently with the stroke of the piston 40, inasmuch as a one to one gear ratio exists between the pinions 45 and 56. Loosely journaled on said shaft 55, is a disk 57, the hub of which affords a female jaw clutch member, and near the other end of the shaft is another similar disk 58, the hub of which forms another female member of a jaw clutch, and feathered on the shaft 55, between said disks is a male double jaw clutch member 59, adapted to secure either one of said disks 57 or 58, to the shaft 55, to be driven by, or oscillated therewith. Keyed upon the hub extension of the disk 57, is a ratchet wheel 60. Journaled between the disk 57, and the ratchet wheel 60, is a crank 62, and similarly journaled between the disk 58, and ratchet wheel 61, is a crank 63. The crank 62, is connected to be operated by the eccentric 53, through a connecting rod 64, and similarly the crank 63, is connected to be operated by the eccentric 54, by a connecting rod 65. As shown in Figs. 3 and 4, a double acting spring impelled pawl, one denoted by the reference numeral 66, is mounted on the crank 62, and another similar pawl 67, upon the crank 63, said pawls, when thrown downwardly in one direction, acting to move the respective ratchet wheels 60 or 61, as the case may be, in one direction, and when thrown downwardly in the other direction acting to move said ratchet wheels in an opposite direction.

Connected to the disk 57, is a connecting rod 68, which is also connected upon the gear 30, disposed between the yoke formed on the shaft 7, and connected to the disk 58, is a connecting rod 69, which is also connected to said disk 27, on the shaft 7. A single lever 70, is provided, pivoted upon the table 24, for actuating the respective slidable double male clutch members 52 and 59, simultaneously and oppositely, as clearly illustrated in Fig. 3, so that when said lever 70, is thrown to the right, the clutch member 59, is engaged with the disk 58, and the clutch member 50, is engaged with the gear 48.

The operation is as follows:

As already pointed out, the cutter head 38, is capable of moving over a certain area, either swinging in an irregular path in one direction and being stepped downwardly or upwardly or to the right or left, as the case may be, during the first part of a swing over the surface, or swinging similarly in another direction substantially at a right angle to the first path of movement. These swinging movements of the cutter head are imparted thereto by the mechanisms mounted on the table on the carriage, which is adjustable on the toothed tracks or racks 4, 5, and 6, to feed the cutter forwardly as the cut is made. Assuming steam to be admitted into the double acting steam cylinder 39, the piston rod 40, is caused to reciprocate and thereby transmit an oscillating movement to the shaft 43, on which the large bevel gear 44, and small bevel pinion 45, are mounted. Due to the gear ratio between the large bevel gear 44, and the bevel pinion 47, with which it meshes, a complete rotation is transmitted to the shaft 45ª, for each stroke or oscillation of the piston 40, and the pinion 56, which meshes with the pinion 45, transmits an oscillatory movement of the same degree to the shaft 55. With the double acting clutch lever 70, in the neutral position shown in Fig. 3, no drive is imparted to the mechanisms to swing the arm 33—35, on which the cutter head is mounted. Assuming the lever 70, shown in Fig. 3, to be swung to the right, the clutch 59, will engage with the disk 58, thereby engaging the same, with the shaft 55, and the clutch member 50, will be engaged with the gear 48. The oscillatory movements of the disk 58, are transmitted through the connecting rod 69, to the disk 27, which, being rigidly connected to one of the yoke arms 28, causes the entire yoke 28—29, to oscillate or swing vertically, and consequently the arm 33—35, and the cutter head 38, therewith.

The swinging movement imparted to the yoke 28—29, by said disk 27, causes the gear 34, to roll upon the gear 30, and acts to swing the arm 33—35, horizontally, and this movement is interrupted due to the advance or feed movement imparted to the gear 30, through the connecting rod 68, from the disk 57, inasmuch as said disk is advanced a distance equal to the pitch of its ratchet wheel 60, once during each stroke of the piston in the cylinder 39, by the eccentric 53, through the connecting rod 64, and said ratchet wheel 60. The resultant movement of the cutter head 38, is consequently along an irregular path, but the reverse swing thereof is exactly symmetrical therewith along a path parallel thereto as the gear 34, again rolls upon the gear 30. The movement of the gear 30, received from time to time from the connecting rod 68, due to the movement of the ratchet wheel 60, and eccentric 53, is sufficient to advance, or step, or set over the cutter head a certain amount during the first part of each swing thereof, so that although the path traced by the cutter head is irregular, the successive paths are parallel and symmetrical therewith over a predetermined area. The set over or step adjustment of the cutter head may be caused to take place in an opposite direction by merely reversing the pawl 66, the same being a double acting pawl, exactly the same as the pawl 67, shown in Fig. 4.

Another series of cuts may be made by the cutter head along paths substantially at right angles to those made with the clutch lever 70, thrown to the right, by shifting the lever to the left, thereby locking the disk 57, to the shaft 55, to be driven thereby, and imparting a swing to the arm 33—35, and causing the step by step adjustment to be made through the gears 49, 52, eccentric 54, ratchet wheel 61, and thence through the disk 58, and connecting rod 69, to the disk 27. If it is desired at any time to swing the entire mechanism back out of the field of operation to permit access to the wall through which the bore is being projected, it is only necessary to loosen the bolt 9, and slide the bracket 8, inwardly along the shaft 7, and then raise the dog 21, and swing the shaft 7, rearwardly about its pivot shaft 12, into a position substantially parallel to the axis of the tunnel shield.

Of course the mechanisms shown as illustrative of the principles of my invention are capable of being varied through a wide range and modified to a large extent, and I therefore do not purpose limiting the patent granted otherwise than necessitated by the prior art.

I claim as my invention:

1. An excavating device of the class described comprising a pivotally mounted shaft, means advancing the same forwardly, a swinging arm connected with said shaft and mechanisms for swinging said arm through a relatively wide angle to break the material into which the same is thrust.

2. In an excavating device of the class described, a movable carriage, a shaft swingingly connected therewith, a swinging arm mounted thereon, means for locking said shaft from movement, and cumulatively acting mechanisms operating to swing said arm, the one operating to impart a horizontal movement and the other a vertical movement to said arm to effect a composite movement thereof.

3. In an excavating device of the class described, a movable carriage, means swingingly mounted thereon, locking means therefor, a swinging arm mounted on said means, a stationary cutter head on the end of said arm, means adjusting said cutter head at different positions with respect to said arm, and power mechanisms mounted on said first mentioned means to swing said arm to cut material into which the cutter head is projected.

4. In an excavating device of the class described, a carriage, means advancing the same, a swingingly mounted shaft on said carriage, means locking the same in a fixed position, a swinging arm on said carriage, a cutter head on the end of said arm, and mechanisms mounted on said carriage to swing said arm and to advance the same step by step to one side or the other to effect a cut in a predetermined area against which the cutter head is projected.

5. In an excavating device of the class described, a carriage, means advancing the same, a horizontally swinging shaft on said carriage, a horizontally and vertically swinging arm connected with said shaft, a cutter head on the end thereof, means adjusting the cutter head with respect to said arm, and power mechanisms on said carriage for swinging said arm to effect a resultant movement thereof due to a combination of vertical and horizontal movements imparted thereto.

6. In an excavating device of the class described, a carriage, a shaft movably connected thereto, means on said carriage for locking said shaft from movement, an arm swingingly mounted on said shaft adapted to be swung horizontally and vertically with respect thereto, a cutter head on the end of said arm, and power mechanisms mounted on said carriage adapted to advance said arm in one direction and swing the same in another, and adapted for reversal to swing
5 the arm in one direction and advance the same in another.

In testimony whereof I have hereunto subscribed my name in the presence of two subscribing witnesses.

CORNELIUS G. HASTINGS.

Witnesses:
CHARLES W. HILLS, Jr.,
EARL M. HARDINE.

Copies of this patent may be obtained for five cents each, by addressing the "Commissioner of Patents, Washington, D. C."